(12) United States Patent
Sarwer et al.

(10) Patent No.: US 11,606,577 B2
(45) Date of Patent: Mar. 14, 2023

(54) METHOD FOR PROCESSING ADAPTIVE COLOR TRANSFORM AND LOW-FREQUENCY NON-SEPARABLE TRANSFORM IN VIDEO CODING

(71) Applicant: ALIBABA GROUP HOLDING LIMITED, Grand Cayman (KY)

(72) Inventors: Mohammed Golam Sarwer, Cupertino, CA (US); Yan Ye, San Diego, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/343,373

(22) Filed: Jun. 9, 2021

(65) Prior Publication Data

US 2021/0385491 A1   Dec. 9, 2021

Related U.S. Application Data

(60) Provisional application No. 63/036,499, filed on Jun. 9, 2020.

(51) Int. Cl.
*H04N 19/60* (2014.01)
*H04N 19/169* (2014.01)
*H04N 19/186* (2014.01)
*H04N 19/46* (2014.01)

(52) U.S. Cl.
CPC .......... *H04N 19/60* (2014.11); *H04N 19/186* (2014.11); *H04N 19/1883* (2014.11); *H04N 19/46* (2014.11)

(58) Field of Classification Search
CPC ................. H04N 19/60; H04N 19/186; H04N 19/1883; H04N 19/46

USPC ..................................................... 375/240.18
See application file for complete search history.

(56) References Cited

U.S. PATENT DOCUMENTS

| | | |
|---|---|---|
| 2014/0003497 A1 | 1/2014 | Sullivan et al. |
| 2014/0355689 A1 | 12/2014 | Tourapis |
| 2016/0100167 A1 | 4/2016 | Rapaka et al. |
| 2017/0094313 A1 | 3/2017 | Zhao et al. |
| 2017/0094314 A1 | 3/2017 | Zhao et al. |
| 2018/0035015 A1 | 2/2018 | Olivier et al. |
| 2021/0120272 A1* | 4/2021 | Auyeung ............. H04N 19/176 |
| 2021/0195242 A1* | 6/2021 | Egilmez ................ H04N 19/60 |

FOREIGN PATENT DOCUMENTS

| | | | |
|---|---|---|---|
| WO | WO-2021107641 A1 * | 6/2021 | |
| WO | WO-2021150085 A1 * | 7/2021 | |

OTHER PUBLICATIONS

Bross et al., "Versatile Video Coding (Draft 9)," JVET-R2001-vB, 18th Meeting: by teleconference, Apr. 15-24, 2020, 523 pages.

(Continued)

*Primary Examiner* — Ayman A Abaza
(74) *Attorney, Agent, or Firm* — Finnegan, Henderson, Farabow, Garrett & Dunner, LLP

(57) ABSTRACT

Methods, apparatus and non-transitory computer readable medium for processing video data are provided. The method includes: receiving one or more video sequences for processing; and coding the one or more video sequences using only one of a low-frequency non-separable transform (LFNST) and an adaptive color transform (ACT) when coding of both LFNST and ACT is not allowed.

9 Claims, 23 Drawing Sheets

(56) References Cited

OTHER PUBLICATIONS

Chen et al., "Algorithm Description of Joint Exploration Test Model 7 (JEM 7)," JVET-G1001-v1, 7$^{th}$ Meeting: Torino, IT, Jul. 13-21, 2017, 50 pages.

Chen et al., "Algorithm Description of Joint Exploration Test Model 8 (JEM 8)," JVET-Q2002-v1, 17$^{th}$ Meeting: Brussels, BE, Jan. 7-17, 2020, 91 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

JEM, https://jvet.hhi.fraunhofer.de/svn/svn_HMJEMSoftware.

Segall et al., "Joint Call for Proposals on Video Compression with Capability beyond HEVC," JVET-H1002 (v6), 8$^{th}$ Meeting: Macao, CN, Oct. 18-24, 2017, 27 pages.

Sullivan et al., "Overview of the High Efficiency Video Coding (HEVC) Standard," IEE Transactions on Circuits and Systems for Video Technology, vol. 22, No. 12, pp. 1649-1668 (2012).

PCT International Search Report and Written Opinion dated Sep. 22, 2021, issued in corresponding International Application No. PCT/US2021/036639 (7 pgs.).

Kerdranvat et al., "The Video Codec Landscape in 2020," ITU Journal: ICT Discoveries, vol. 3(1), Jun. 8, 2020, 11 pages.

\* cited by examiner

800

| | |
|---|---|
| sps_palette_enabled_flag | u(1) |
| sps_lfnst_enabled_flag | u(1) |
| if( ChromaArrayType == 3 && sps_max_luma_transform_size_64_flag && sps_lfnst_enabled_flag) | |
| sps_act_enabled_flag | u(1) |
| if( sps_transform_skip_enabled_flag \|\| sps_palette_enabled_flag ) | |
| sps_internal_bit_depth_minus_input_bit_depth | ue(v) |
| sps_ibc_enabled_flag | u(1) |
| if( sps_ibc_enabled_flag ) | |
| sps_six_minus_max_num_ibc_merge_cand | ue(v) |
| sps_lmcs_enabled_flag | u(1) |
| ~~sps_lfnst_enabled_flag~~ | ~~u(1)~~ |

FIG. 9

1001 sps_act_enabled_flag equal to 1 specifies that act_idx may be present in intra coding unit syntax. sps_act_enabled_flag equal to 0 specifies that act_idx is not present in intra coding unit syntax.

When sps_act_enabled_flag is not present, it is inferred to be equal to 0.

FIG. 10

1101 — sps_act_enabled_flag equal to 1 specifies that adaptive colour transform is enabled and may be used in decoding of pictures in the CLVS and the cu_act_enabled_flag may be present in the coding unit syntax of the CLVS. sps_act_enabled_flag equal to 0 speifies that adaptive colour transform is disabled and not used in decoding of pictures in the CLVS and cu_act_enabled_flag is not present in the coding unit syntax of the CLVS. When sps_act_enabled_flag is not present, it is inferred to be equal to 0.

*It is a requirement of bitstream conformance that when the value of sps_lfnst_enabled_flag is equal to 1, the value of sps_act_enabled_flag shall be equal to 0.*

| | |
|---|---|
| sps_palette_enabled_flag | u(1) |
| if( ChromaArrayType == 3 && !sps_max_luma_transform_size_64_flag) | |
|     sps_act_enabled_flag | u(1) |
| if( sps_transform_skip_enabled_flag \|\| sps_palette_enabled_flag ) | |
|     sps_internal_bit_depth_minus_input_bit_depth | ue(v) |
| sps_ibc_enabled_flag | u(1) |
| if( sps_ibc_enabled_flag ) | |
|     sps_six_minus_max_num_ibc_merge_cand | ue(v) |
| sps_lmcs_enabled_flag | u(1) |
| if(! sps_act_enabled_flag) | |
|     sps_lfnst_enabled_flag | u(1) |

1302 — (dashed row: if(! sps_act_enabled_flag))
1301 — (dashed row: sps_lfnst_enabled_flag)

FIG. 13

1401 sps_lfnst_enabled_flag equal to 1 specifies that lfnst_idx may be present in intra coding unit syntax. sps_lfnst_enabled_flag equal to 0 specifies that lfnst_idx is not present in intra coding unit syntax.

*When sps_lfnst_enabled_flag is not present, it is inferred to be equal to 0.*

FIG. 14

1501 sps_lfnst_enabled_flag equal to 1 specifies that lfnst_idx may be present in intra coding unit syntax. sps_lfnst_enabled_flag equal to 0 specifies that lfnst_idx is not present in intra coding unit syntax.

*It is a requirement of bitstream conformance that when the value of sps_act_enabled_flag is equal to 1, the value of sps_lfnst_enabled_flag shall be equal to 0.*

| | |
|---|---|
| 1701 — if( cu_act_enabled_flag && Min( lfnstWidth, lfnstHeight ) >= 4 && sps_lfnst_enabled_flag == 1 &&<br>    CuPredMode[ chType ][ x0 ][ y0 ] == MODE_INTRA && lfnstNotTsFlag == 1 &&<br>    ( treeType == DUAL_TREE_CHROMA || !intra_mip_flag[ x0 ][ y0 ] ||<br>    Min( lfnstWidth, lfnstHeight ) >= 16 ) &&<br>    Max( cbWidth, cbHeight ) <= MaxTbSizeY ) { | |
|   if( IntraSubPartitionsSplitType != ISP_NO_SPLIT || LfnstDcOnly == 0 ) &&<br>    LfnstZeroOutSigCoeffFlag == 1 ) | |
| 1702 —     lfnst_idx | ae(v) |
| } | |

FIG. 17

1801 cu_act_enabled_flag equal to 1 specifies that the residuals of the current coding unit are coded in $YC_gC_o$ colour space. cu_act_enabled_flag equal to 0 specifies that the residuals of the current coding unit are coded in original colour space. When cu_act_enabled_flag is not present, it is inferred to be equal to 0.

*It is a requirement of bitstream conformance that when the value of lfnst_idx is not equal to 0, the value of cu_act_enabled_flag shall be equal to 0.*

FIG. 18 lfnst_idx specifies whether and which one of the two low frequency non-separable transform kernels in a selected transform set is used. lfnst_idx equal to 0 specifies that the low frequency non-separable transform is not used in the current coding unit.

When lfnst_idx is not present, it is inferred to be equal to 0.

1901 — *It is a requirement of bitstream conformance that when the value of cu_act_enabled_flag is equal to 1, the value of lfnst_idx shall be equal to 0.*

Determining a variable for indicating the LFNST being applied in a current coding unit based on the ACT in the current coding unit. — 2002

FIG. 20 lfnst_idx specifies whether and which one of the two low frequency non-separable transform kernels in a selected transform set is used. lfnst_idx equal to 0 specifies that the low frequency non-separable transform is not used in the current coding unit.

When lfnst_idx is not present, it is inferred to be equal to 0.

The variable ApplyLfnstFlag is derived as follows:

2101 — – If treeType is equal to SINGLE_TREE, the following applies:

ApplyLfnstFlag = ( lfnst_idx > 0 && cIdx == 0 && cu_act_enabled_flag == 0 ) ? 1 : 0        (177)

2103
2102 — – Otherwise, the following applies:

ApplyLfnstFlag = ( lfnst_idx > 0 && cu_act_enabled_flag == 0 ) ? 1 : 0

FIG. 21

METHOD FOR PROCESSING ADAPTIVE COLOR TRANSFORM AND LOW-FREQUENCY NON-SEPARABLE TRANSFORM IN VIDEO CODING

CROSS-REFERENCE TO RELATED APPLICATIONS

This disclosure claims the benefits of priority to U.S. Provisional Application No. 63/036,499, filed on Jun. 9, 2020, which is incorporated herein by reference in its entirety.

TECHNICAL FIELD

The present disclosure generally relates to video processing, and more particularly, to methods and apparatus for controlling interaction between adaptive color transform and low-frequency non-separable transform in video coding.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a computer-implemented video encoding method. The method includes: receiving one or more video sequences for processing; and coding the one or more video sequences using only one of a low-frequency non-separable transform (LFNST) and an adaptive color transform (ACT).

Embodiments of the present disclosure provide an apparatus for performing video data processing, the apparatus including: a memory figured to store instructions; and a processor coupled to the memory and configured to execute the instructions to cause the apparatus to perform: receiving one or more video sequences for processing; and coding the one or more video sequences using only one of a low-frequency non-separable transform (LFNST) and an adaptive color transform (ACT).

Embodiments of the present disclosure provide a non-transitory computer-readable storage medium that stores a set of instructions that is executable by one or more processors of an apparatus to cause the apparatus to initiate a method for performing video data processing, the method includes: receiving one or more video sequences for processing; and coding the one or more video sequences using only one of a low-frequency non-separable transform (LFNST) and an adaptive color transform (ACT).

BRIEF DESCRIPTION OF THE DRAWINGS

Embodiments and various aspects of the present disclosure are illustrated in the following detailed description and the accompanying figures. Various features shown in the figures are not drawn to scale.

FIG. 9 shows an exemplary SPS syntax, according to some embodiments of the present disclosure.

FIG. 10 shows an exemplary semantics for an updated syntax element sps_act_enabled_flag, according to some embodiments of the present disclosure.

FIG. 11 shows an exemplary semantics for an updated syntax element sps_act_enabled_flag, according to some embodiments of the present disclosure.

FIG. 13 shows an exemplary SPS syntax with an updated sps_lfnst_enabled_flag, according to some embodiments of the present disclosure.

FIG. 14 shows an exemplary semantics for an updated syntax element sps_lfnst_enabled_flag, according to some embodiments of the present disclosure.

FIG. 15 shows an exemplary semantics for an updated syntax element sps_lfnst_enabled_flag, according to some embodiments of the present disclosure.

FIG. 17 shows an exemplary syntax including syntax element cu_act_enabled_flag, according to some embodiments of the present disclosure.

FIG. 18 shows an exemplary semantics for an updated syntax element cu_act_enabled_flag, according to some embodiments of the present disclosure.

FIG. 19 shows an exemplary semantics for an updated syntax element lfnst_ldx, according to some embodiments of the present disclosure.

FIG. 20 shows an exemplary flow chart of an encoding method for LFNST and ACT, according to some embodiments of the present disclosure.

FIG. 21 shows an exemplary semantics for an updated variable ApplyLfnstFlag, according to some embodiments of the present disclosure.

DETAILED DESCRIPTION

Figure 1:
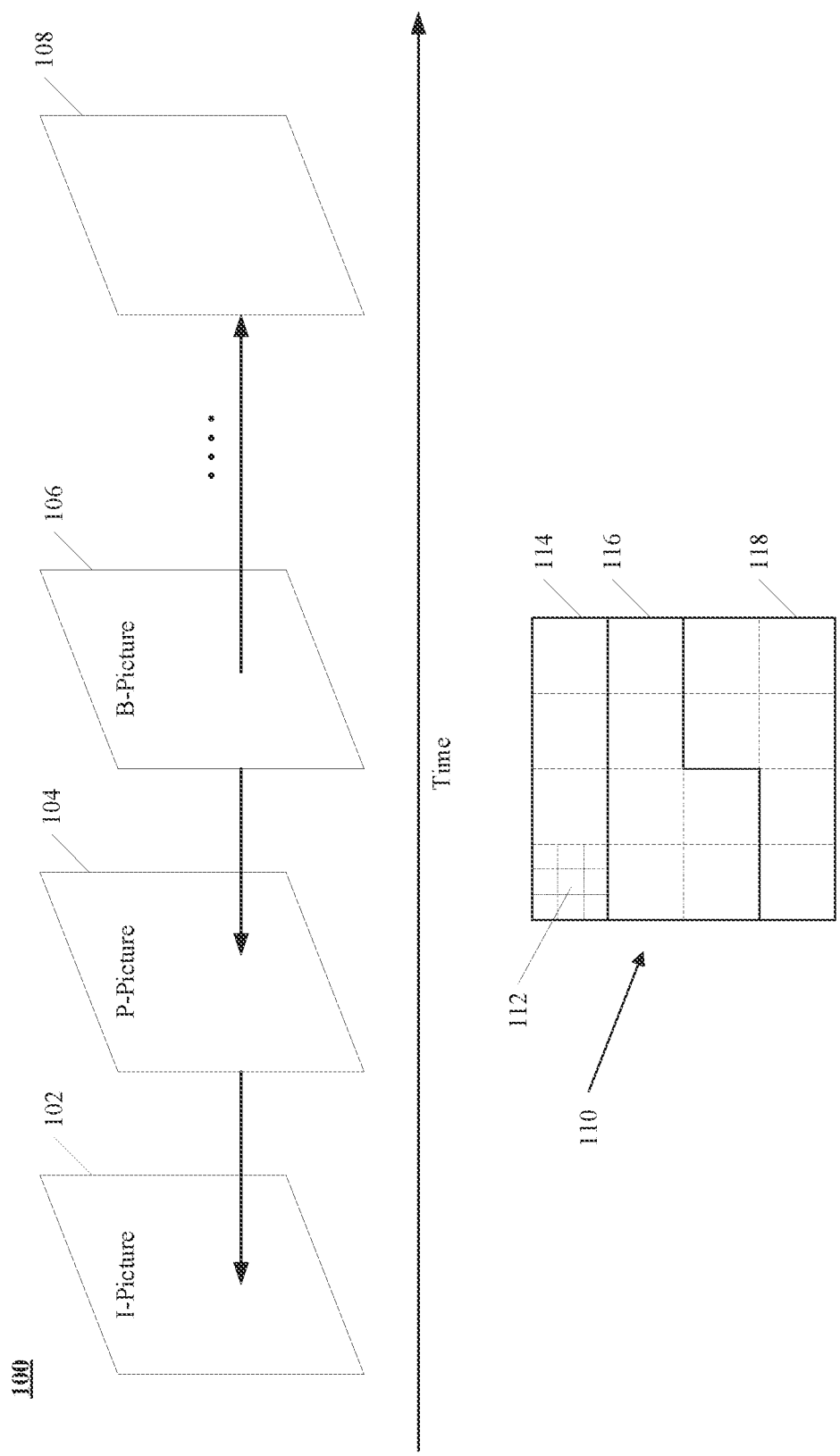
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
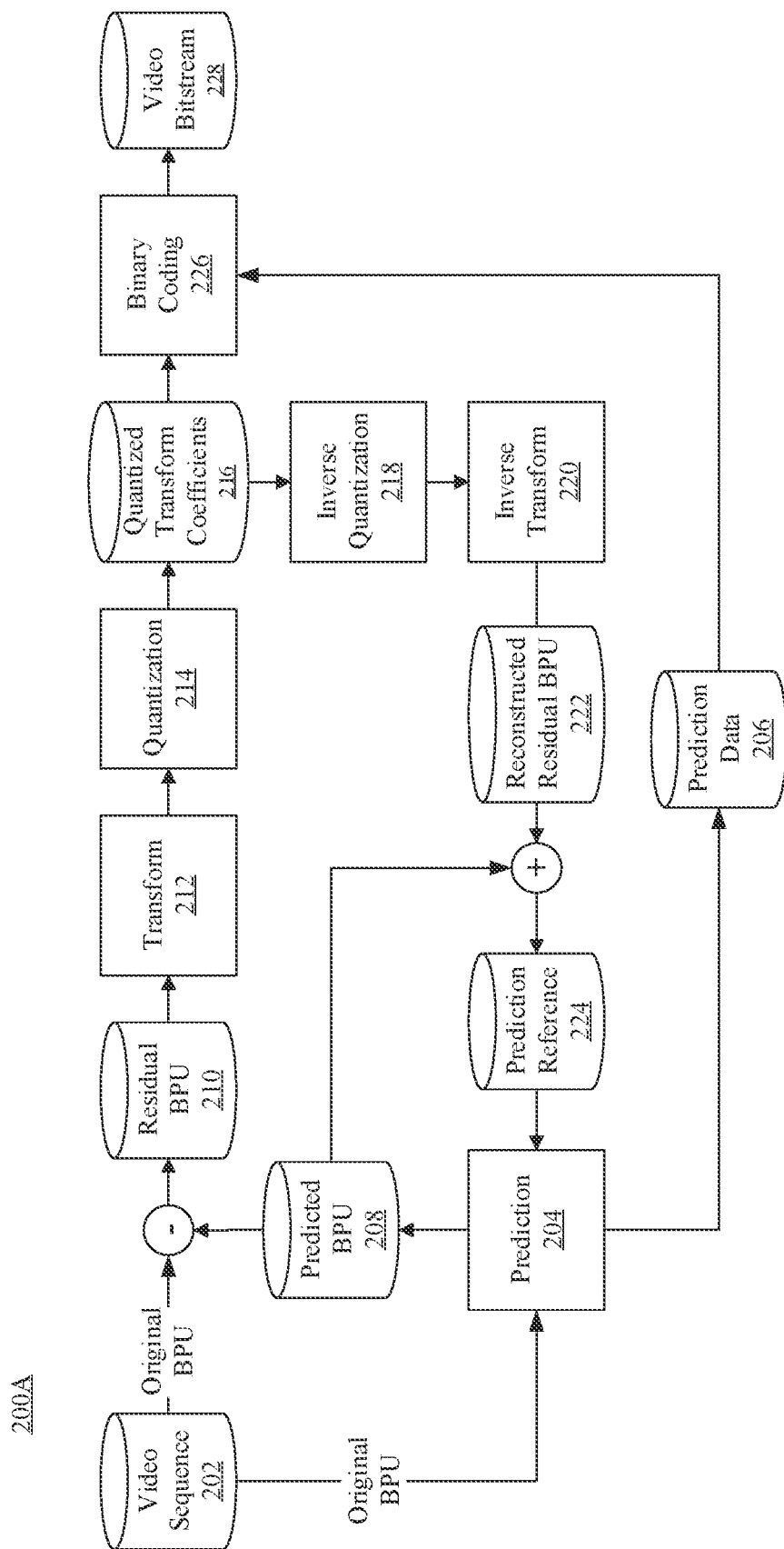
FIG. 2A is a schematic diagram illustrating an exemplary encoding process of a hybrid video coding system, consistent with embodiments of the disclosure.
Figure 2B:
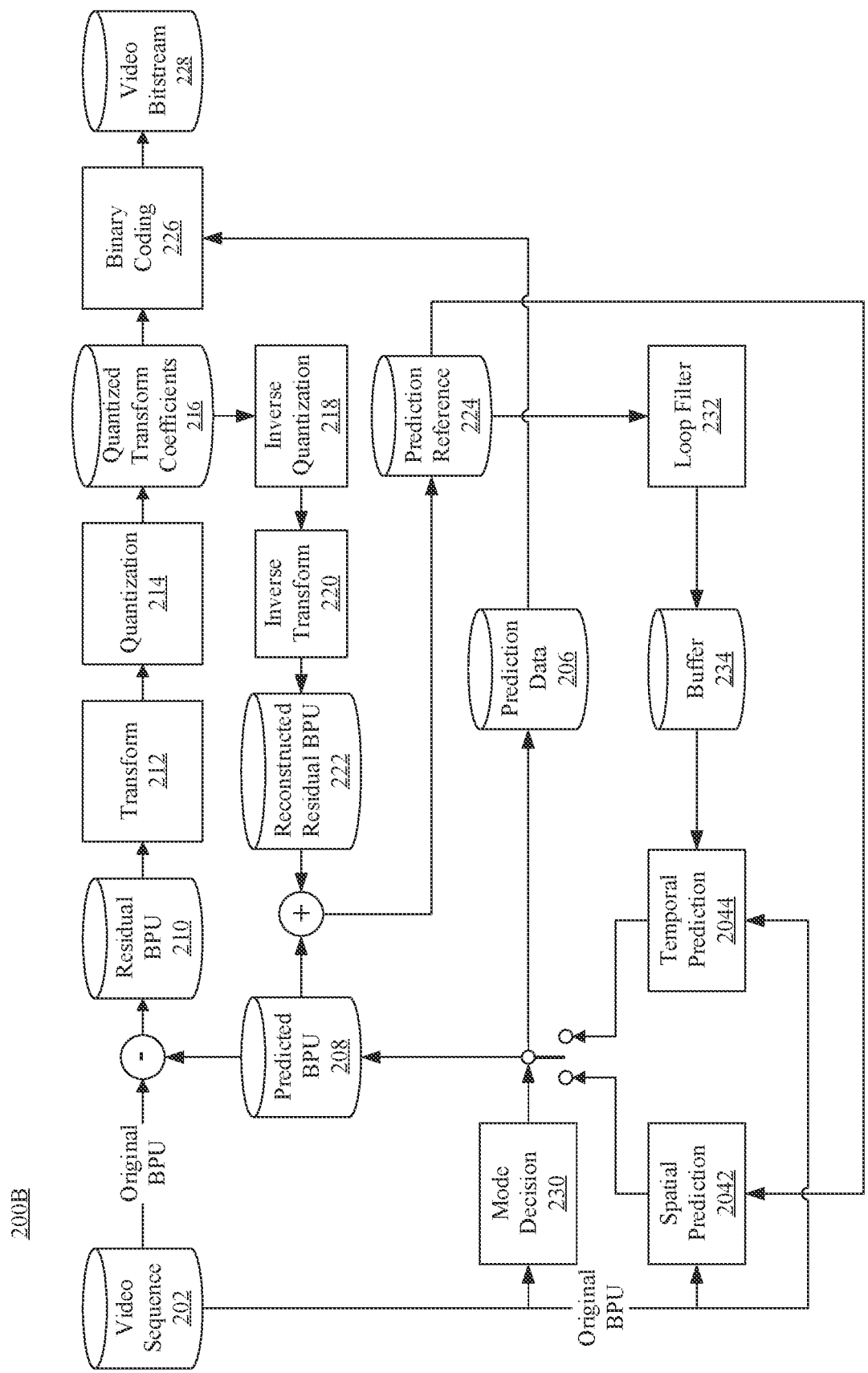
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an exemplary encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another exemplary encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG.

1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
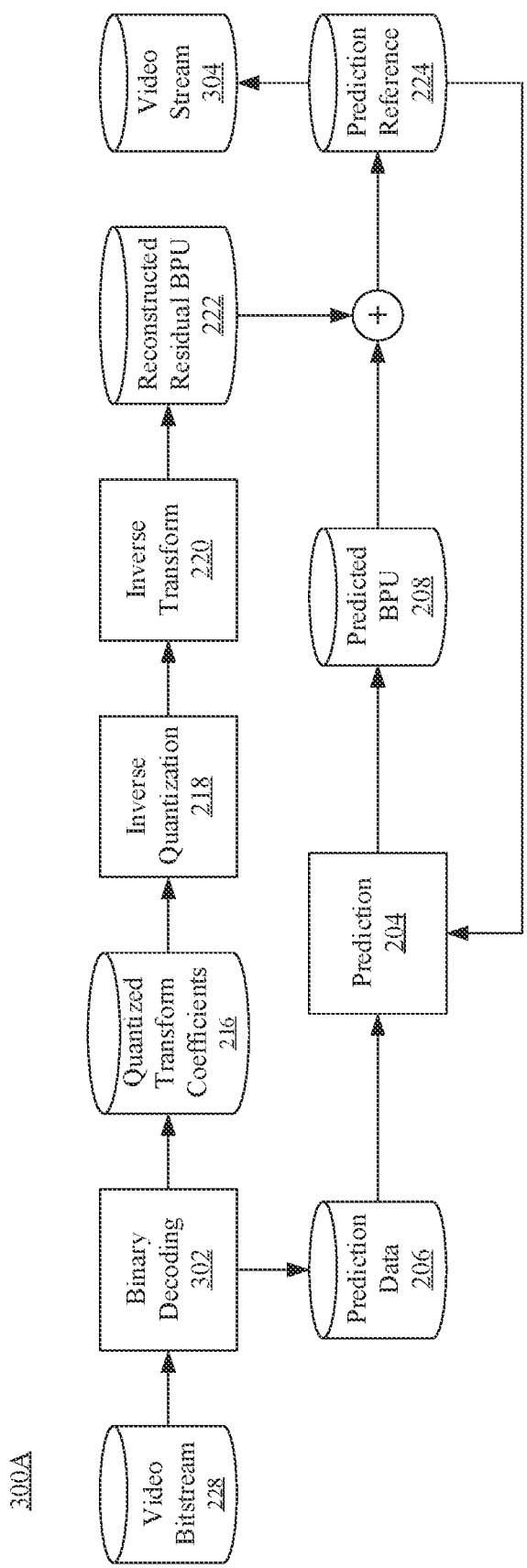
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIG. 2A and FIG. 2B), generally, video stream 304 is not identical to video sequence 202. Similar to processes 200A and 200B in FIG. 2A and FIG. 2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
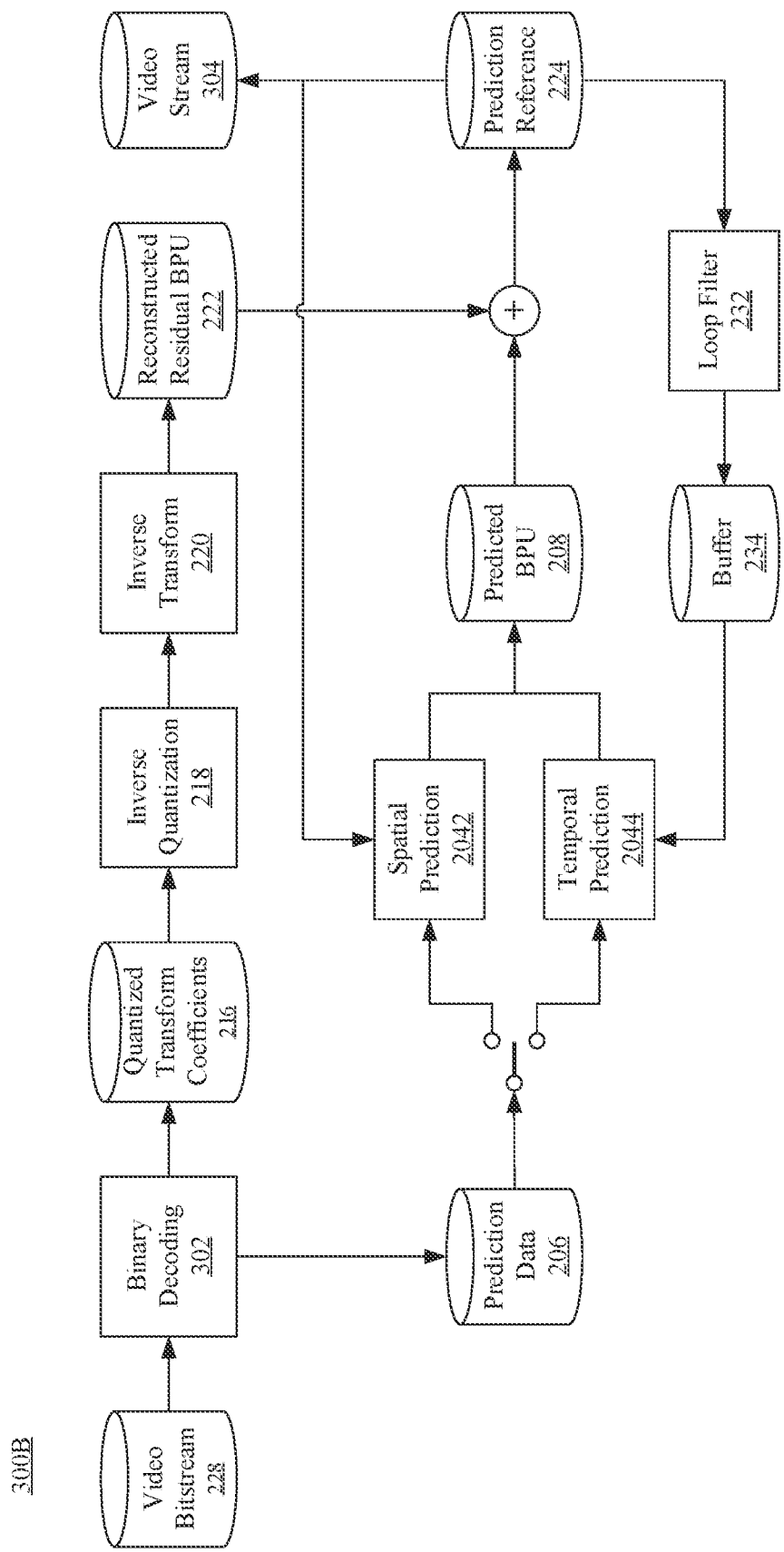
FIG. 3B is a schematic diagram illustrating another exemplary decoding process of a hybrid video coding system, consistent with embodiments of the disclosure.

FIG. 3B illustrates a schematic diagram of another exemplary decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
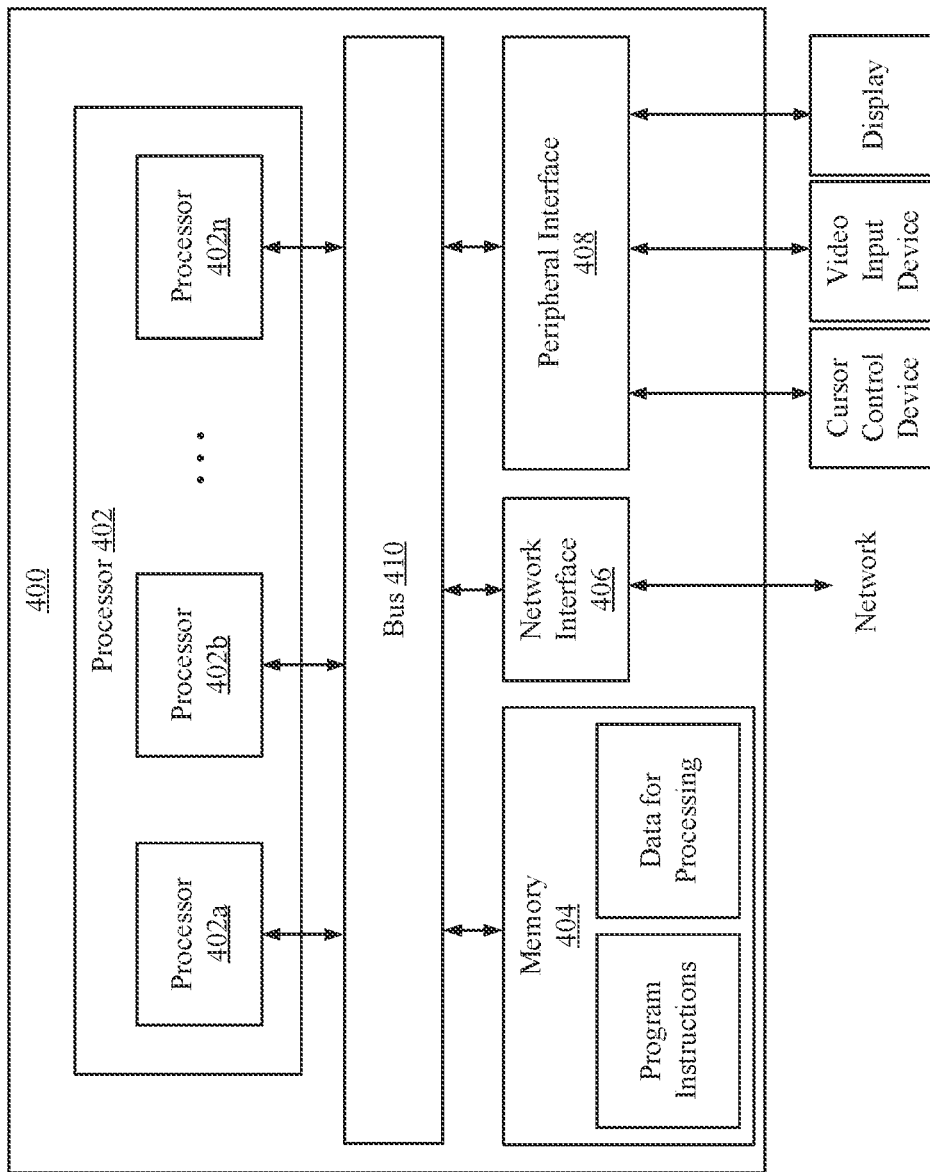
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Figure 5:
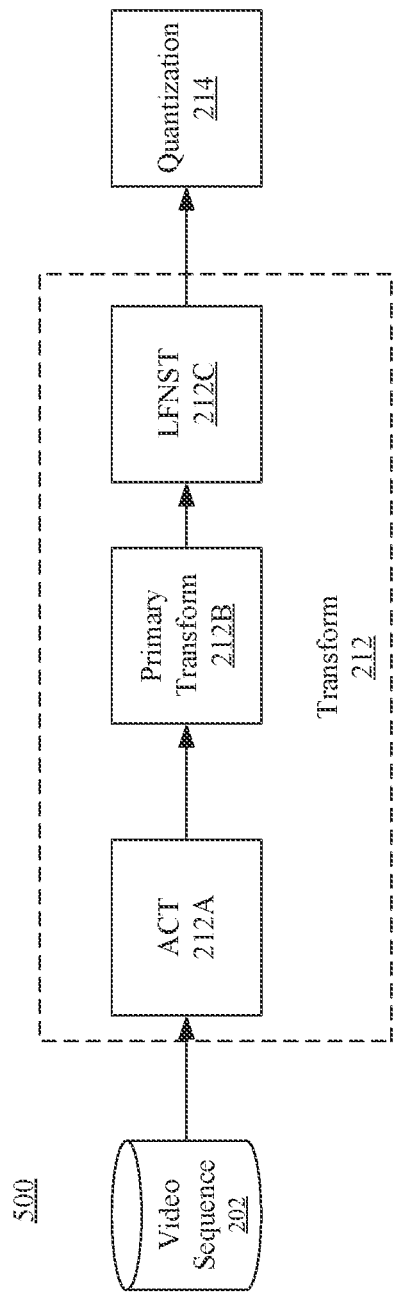
FIG. 5 shows an exemplary processing flow of an encoding process.

FIG. 5 shows an exemplary processing flow of an encoding process. In some embodiments, encoding process 500 can be applied to the VVC standard. As shown in FIG. 5, in encoding process 500, the transform stage 212 may include an adaptive color transform (ACT) 212A that is also applied to reduce redundancy between three color components in 4:4:4 chroma format. The ACT 212A performs in-loop color space conversion in the prediction residual domain by adaptively converting the residuals from the input color space (e.g., usually in RGB color space) to YCgCo space. Two color spaces are adaptively selected by signaling one ACT flag at a coding unit (CU) level. When the ACT flag is equal to 1, the residuals of the CU are coded in the YCgCo space. When the ACT flag is not equal to 1 (e.g., the ACT flag is equal to 0), the residuals of the CU are coded in the original color space (e.g., usually in RGB color space). The encoding process 500 can also include a primary transform 212B, which can be applied to an output of ACT 212A, and a low-frequency non-separable transform (LFNST) 212C, which can be applied to the output of primary transform 212B. Quantization 214 can receive the output of LFNST 212C.

Figure 6:
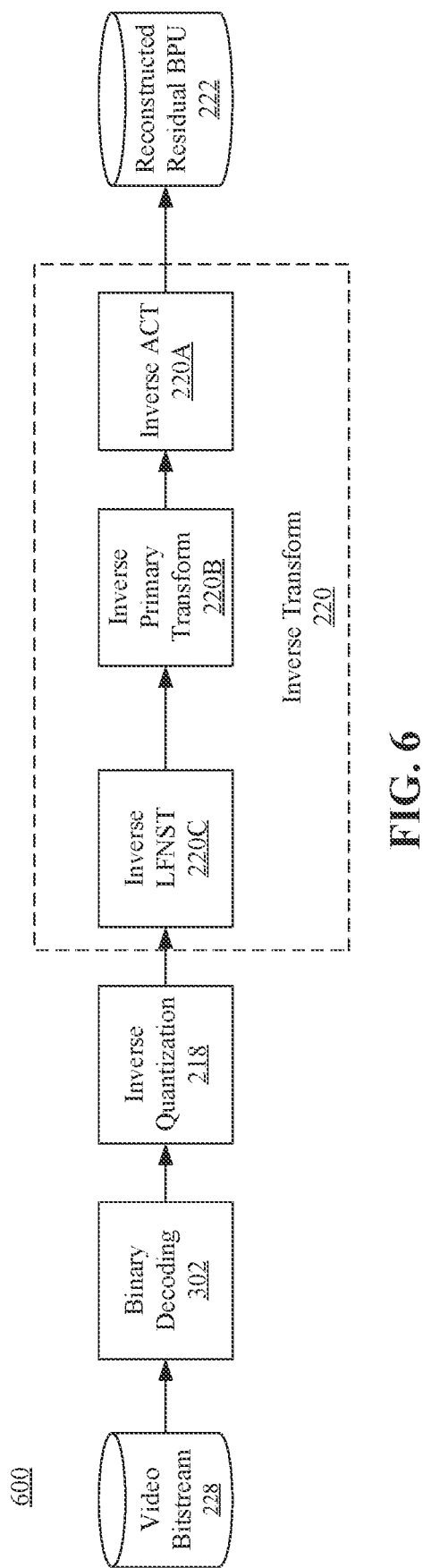
FIG. 6 shows an exemplary processing flow of a decoding process.

FIG. 6 shows an exemplary processing flow of a decoding process. In some embodiments, decoding process 600 can be applied to the VVC standard. As shown in FIG. 6, in decoding process 600, the inverse transform stage 220 may include an inverse LFNST 220C and an inverse primary transform 220B, and the inverse LFNST 220C is applied between inverse quantization 218 and the inverse primary transform 220B. The decoding process can also include an inverse ACT 220A, which can be applied to an output of inverse primary transform 220B. Reconstructed residual BPU 222 can receive the output of inverse ACT 220A. In LFNST 212C, a 4×4 non-separable transform or an 8×8 non-separable transform is applied according to block size. Four transform sets are used in LFNST 212C. For each transform set, the selected non-separable secondary transform candidate is further specified by the explicitly signaled LFNST index. The index is signaled in a bit-stream once per intra coding unit (CU) after transform coefficients.

In VVC, a discrete cosine transform type-II (DCT-II) is used as a primary transform. In addition to DCT-II, a Multiple Transform Selection (MTS) scheme is also used where a primary transform is selected from the multiple selected transforms of the Discrete Cosine Transform 8 (DCT8)/Discrete Sine Transform 7 (DST7).

The transform 212 as shown in FIG. 5 can be a very complex unit. For example, LFNST 212C is a complex process due to matrix multiplication. As a result, cascading the three inverse transforms (e.g., inverse LFNST 220C followed by inverse primary transform 220B followed by inverse ACT 220A as shown in FIG. 6) requires more clock cycles and increases the latency of the decoding pipeline. Moreover, the LFNST matrix sets are trained using residual signals that are in YUV color space. They may not be optimized for ACT coded blocks, as ACT residuals are usually in the YCoCg color space. Therefore, the combination of LFNST 212A with ACT 212C may not be beneficial in terms of compression performance.

Figure 7:
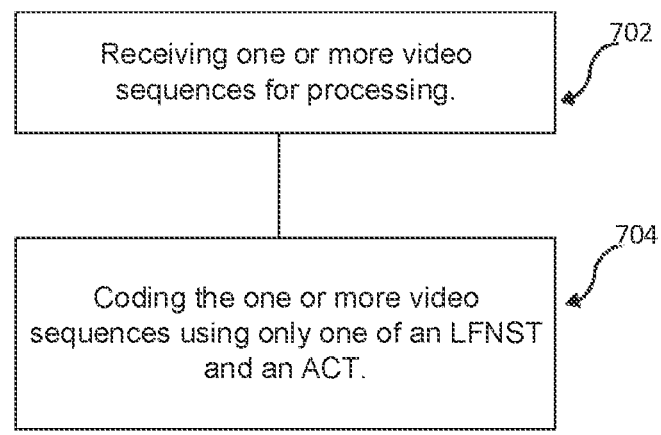
FIG. 7 shows an exemplary flow chart of an encoding method, according to some embodiments of the present disclosure.

Embodiments of the present disclosure provide an updated encoding and decoding scheme to solve the issues listed above, such as improving compression performance and decreasing latency. FIG. 7 shows an exemplary flow chart of an encoding method 700 for LFNST and ACT, according to some embodiments of the present disclosure. As shown in FIG. 7, method 700 can be performed by an encoder (e.g., by process 200A of FIG. 2A or 200B of FIG. 2B), or performed by one or more software or hardware components of an apparatus (e.g., apparatus 400 of FIG. 4). For example, one or more processors (e.g., processor 402 of FIG. 4) can perform method 700. In some embodiments, method 700 can be implemented by a computer program product, embodied in a computer-readable medium, including computer-executable instructions, such as program code, executed by computers (e.g., apparatus 400 of FIG. 4). Method 700 may include the following steps 702 and 704.

At step 702, one or more video sequences are received for processing. At step 704, the one or more video sequences are coded using only one of a low-frequency non-separable transform (LFNST) and an adaptive color transform (ACT). For example, in the transform stage 212 (referring to FIG. 5), either LFNST 212C or ACT 212B can be used, but the combination of LFNST 212C and ACT 212B is not allowed. If the LFNST 212C is used, the ACT 212B is disabled. If the ACT 212B is used, the LFNST 212C is disabled. Therefore, the efficiency of encoding/decoding process is improved. In some embodiments, method 700 is used in coded layer video sequence (CLVS) level. In some embodiments, method 700 is used in CU level.

Figure 8:
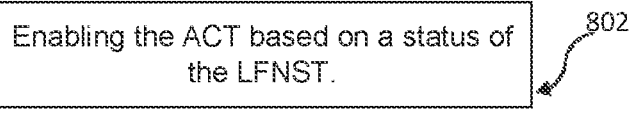
FIG. 8 shows another exemplary flow chart of an encoding method, according to some embodiments of present disclosure.

In CLVS level, in some embodiments, ACT 212A is conditionally processed based on the LFNST 212C. FIG. 8 shows an exemplary flow chart of an encoding method 800 for LFNST and ACT, according to some embodiments of present disclosure. It is appreciated that method 800 can be part of step 704 in method 700 of FIG. 7. At step 802, the ACT is enabled based on a status of the LFNST. For example, if the LFNST is enabled in a CLVS, there is no need to determine the ACT, such that the ACT cannot be used in the CLVS. The ACT can be enabled in a CLVS only when the LFNST is not applied in the CLVS. Therefore, the ACT cannot be enabled if the LFNST is enabled.

In VVC (e.g., VVC Draft 9), there is a sequence parameter set (SPS) syntax element sps_act_enabled_flag to enable or disable ACT of a CLVS. Syntax element sps_act_enabled_flag being equal to 1 can indicate that ACT may be used in encoding/decoding picture of the CLVS. The sps_act_enabled_flag syntax element being equal to 0 can mean ACT is not used in encoding/decoding picture of the CLVS. In some embodiments, another SPS flag sps_lfnst_enabled_flag can be used to signal whether to indicate that the LFNST is enabled or disabled in the CLVS.

FIG. 9 shows an exemplary SPS syntax 900, according to some embodiments of the present disclosure. The SPS syntax structure 900 can be used in method 800. As shown in FIG. 9, changes from the previous VVC are shown in italic, and with proposed deleted syntax being further shown in strikethrough. As shown in FIG. 9, in VVC (e.g., VVC Draft 9), syntax element 901 (e.g., sps_act_enabled_flag) is conditionally signaled based on the value of syntax element 902 (e.g., sps_lfnst_enabled_flag). If the LFNST is enabled (e.g., syntax element 902 is equal to 1) in the CLVS, syntax element 901 is not signaled and inferred to be equal to 0. Since the signaling of syntax element 901 depends on the value of syntax element 902, the syntax element 902 is sent before syntax element 902. As shown in FIG. 9, syntax element 901 is signaled if ChromaArrayType is equal to 3 (e.g., 4:4:4 chroma sub-sampled video), the sps_max_luma_transform_size_64_flag syntax element is equal to 0, and syntax element 902 is equal to 0 (referring to block 903). As a result, syntax element 901 is signaled if syntax element 902 is not enabled (e.g., sps_lfnst_enabled_flag is equal to 0). Therefore, the combination of LFNST and ACT is not allowed for encoding or decoding, hence the complexity of the encoding/decoding process is reduced.

Moreover, the semantic of the syntax element sps_act_enabled_flag can be updated. FIG. 10 shows an exemplary semantics for an updated syntax element sps_act_enabled_flag, according to some embodiments of the present disclosure. As shown in FIG. 10, changes from the previous VVC are shown in italic. A portion 1001 is added that when sps_act_enabled_flag is not present, it is inferred to be equal to 0. Therefore, the sematic of the syntax element sps_act_enabled_flag defines the value of sps_act_enabled_flag when the sps_act_enabled_flag is not present in the encoded/decoded bitstream.

In some embodiments, a bitstream conformance constraint can be imposed to sps_act_enabled_flag, and the semantics of syntax element sps_act_enabled_flag can be updated FIG. 11 shows an exemplary semantics for an updated syntax element sps_act_enabled_flag, according to some embodiments of the present disclosure. As shown in FIG. 11, changes from the previous VVC are shown in italic, referring to block 1101. As shown in FIG. 11, a bitstream conformance constraint 1101 is added, such that when sps_lfnst_enabled_flag is enabled (e.g., value of sps_lfnst_enabled_flag is equal to 1), sps_act_enabled_flag is not enabled (e.g., value of sps_act_enabled_flag is equal to 0). Therefore, the combination of LFNST and ACT is not allowed for encoding or decoding, hence the complexity of the encoding/decoding process is reduced.

Figure 12:
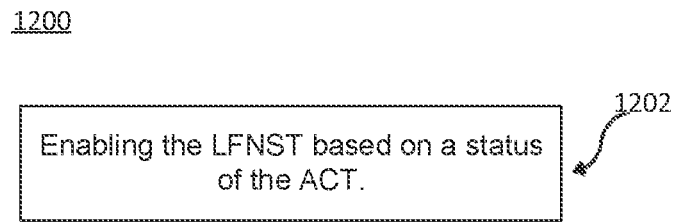
FIG. 12 shows an exemplary flow chart of an encoding method, according to some embodiments of the present disclosure.

In some embodiments, LFNST is conditionally processed based on the ACT. FIG. 12 shows an exemplary flow chart of an encoding method 1200 for LFNST and ACT, according to some embodiments of the present disclosure. It is appreciated that method 1200 can be part of step 704 in method 700 of FIG. 7. At step 1202, the LFNST is enabled based on a status of the ACT. For example, if the ACT is applied in a CLVS, there is no need to determine the LFNST, such that the LFNST cannot be used in the CLVS. The LFNST can be enabled in a CLVS only when the ACT is not applied in the CLVS. Therefore, the LFNST cannot be enabled if the ACT is enabled in a CLVS.

FIG. 13 shows an exemplary SPS syntax with an updated sps_lfnst_enabled_flag, according to some embodiments of the present disclosure. The SPS syntax structure 1300 can be used in method 1200. As shown in FIG. 13, changes from the previous VVC are shown in italic, as shown in block 1302. As shown in FIG. 13, in VVC (e.g., VVC Draft 9), syntax element 1301 (e.g., sps_lfnst_enabled_flag) is conditionally signaled based on the value of sps_act_enabled_flag. Syntax element 1301 is signaled if the value of sps_act_enabled_flag is equal to 0 (that is, the ACT is not enabled). If the value of sps_act_enabled_flag is equal to 1 (that is, the ACT is enabled), syntax element 1301 is not signaled and inferred to be equal to 0. Therefore, the combination of LFNST and ACT is not allowed for encoding or decoding, hence the complexity of the encoding/decoding process is reduced.

Moreover, the semantic of the syntax element sps_lfnst_enabled_flag can be updated. FIG. 14 shows an exemplary semantics for an updated syntax element sps_lfnst_enabled_flag, according to some embodiments of the present disclosure. As shown in FIG. 14, changes from the previous VVC are shown in italic. A portion 1401 is added that when sps_lfnst_enabled_flag is not present, it is inferred to be equal to 0. Therefore, the sematic of the syntax element sps_lfnst_enabled_flag is more robust.

FIG. 15 shows another exemplary semantics for an updated syntax element sps_lfnst_enabled_flag, according to some embodiments of the present disclosure. As shown in FIG. 15, changes from the previous VVC are shown in italic, as shown in block 1501. As shown in FIG. 15, a conformance constraint 1501 is added so that when sps_act_enabled_flag is enabled (e.g., value of sps_act_enabled_flag is equal to 1), sps_lfnst_enabled_flag is not enabled (e.g., value of sps_lfnst_enabled_flag is equal to 0). Therefore, the combination of LFNST and ACT is not allowed for encoding or decoding, hence the complexity of the encoding/decoding process is reduced.

In some embodiments, a bitstream conformance constraint is imposed so that value of sps_act_enabled_flag and the value of sps_lfnst_enabled_flag cannot equal to 1 at the same time. For example, the following constraint can be applied: "It is a requirement of bitstream conformance that the value of sps_act_enabled_flag and the value of sps_lfnst_enabled_flag shall not both be equal to 1 in the bitstream of single CLVS."

Figure 16:
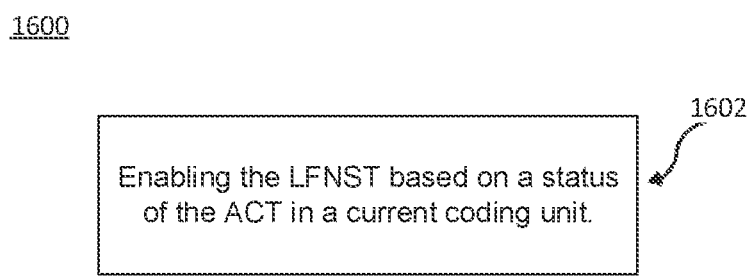
FIG. 16 shows an exemplary flow chart of an encoding method for LFNST transform and ACT transform, according to some embodiments of the present disclosure.

In the previously described embodiments above, the combination of LFNST and ACT is disabled in the CLVS level. In some embodiments, the LFNST and ACT are in the CU level. FIG. 16 shows an exemplary flow chart of an encoding method 1600 for LFNST transform and ACT transform, according to some embodiments of present disclosure. It is appreciated that method 1600 can be part of step 704 in method 700 of FIG. 7. At step 1602, The LFNST is enabled based on a status of the ACT in a current coding unit. For example, whether to use an LFNST in a current CU is determined when the ACT is not enabled in the current CU.

If the ACT is enabled in a current CU, there is no need to determine whether to use the LFNST, such that the LFNST cannot be used in the current CU. The LFNST can be used in a current CU only when the ACT is not applied in the current CU. Therefore, the combination of LFNST and ACT is not allowed in a current CU.

In VVC (e.g., VVC Draft 9), there is a CU level syntax element cu_act_enabled_flag to indicate whether the ACT is applied in the current CU. If the value of cu_act_enabled_flag is equal to 1 (that is, the ACT is enabled in the current CU), ACT is applied in the current CU. Another CU level syntax element lfnst_idx is used, the syntax element lfnst_indx specifies whether and which one of the two LFNST kernels in a selected transform set. Normally, there are four transform sets pre-defined in LFNST, and each transform set has two non-separable transforms (e.g., two LFNST kernels). Syntax element lfnst_idx being equal to 0 specifies that the LFNST is not used in the current CU.

In order to disallow the combination of LFNST and ACT in the CU level, if the value of cu_act_enabled_flag is equal to 1 (that is the ACT is not enabled in the current CU), lfnst_idx is not signaled and inferred to be 0.

In some embodiments, signaling a syntax element lfnst_idx can be based on the cu_act_enabled_flag. FIG. 17 shows an exemplary syntax including syntax element cu_act_enabled_flag, according to some embodiments of the present disclosure. The syntax structure 1700 can be used in method 1600. As shown in FIG. 17, changes from the previous VVC are shown in italic, referring to block 1701. As shown in FIG. 17, if cu_act_enabled_flag is equal to 1, syntax element 1702 (e.g., lfnst_idx) is not signaled. The combination of LFNST and ACT is not allowed for encoding or decoding, hence the complexity of the encoding/decoding process is reduced.

In some embodiments, a bitstream conformance constraint can be imposed so that the value of cu_act_enabled_flag is equal to 0 when the value of syntax element 1702 (e.g., lfnst_idx) is not equal to 0. The semantic of the syntax element cu_act_enabled_flag can be updated. FIG. 18 shows an exemplary semantics for an updated syntax element cu_act_enabled_flag, according to some embodiments of the present disclosure. As shown in FIG. 18, changes from the previous VVC are shown in italic, referring to block 1801. As shown in FIG. 18, a bitstream conformance constraint 1801 is added so that when lfnst_idx is not equal to 0 (that is, the LFNST is used in the current CU), cu_act_enabled_flag is not enabled (e.g., value of cu_act_enabled_flag is equal to 0). Therefore, the combination of LFNST and ACT is not allowed for encoding or decoding, hence the complexity of the encoding/decoding process is reduced.

In some embodiments, a bitstream conformance constraint can be imposed so that the value of lfnst_idx is equal to 0 when the value of cu_act_enabled_flag is equal to 1. The semantic of the syntax element lfnst_Idx can be updated. FIG. 19 shows an exemplary semantics for an updated syntax element lfnst_Idx, according to some embodiments of the present disclosure. As shown in FIG. 19, changes from the previous VVC are shown in italic, referring to block 1901. As shown in FIG. 19, a bitstream conformance constraint 1901 is added such that when cu_act_enabled_flag is enabled (e.g., the value of cu_act_enabled_flag is equal to 1), lfnst_Idx is not enabled (e.g., value of lfnst_Idx is equal to 0). Therefore, the combination of LFNST and ACT is not allowed for encoding or decoding, hence the complexity of the encoding/decoding process is reduced.

FIG. 20 shows an exemplary flow chart of an encoding method 2000 for LFNST and ACT, according to some embodiments of present disclosure. It is appreciated that method 2000 can be part of step 704 in method 700 of FIG. 7. At step 2002, a variable for indicating the LFNST being applied in a current coding unit is determined based on the ACT being not enabled in the current coding unit. The variable is not derived if the ACT is enabled in the current CU, such that the LFNST cannot be used in the current CU when the ACT is enabled. The variable is derived only when the LFNST is used in the current CU and the ACT is not enable, for guaranteeing a combination of LFNST and ACT is not allowed. FIG. 21 shows an exemplary semantics for an updated variable ApplyLfnstFlag, according to some embodiments of the present disclosure. This semantics can be used in method 2000. As shown in FIG. 21, changes from the previous VVC are shown in italic. As shown in FIG. 21, only when ACT is not enabled in the current CU (e.g., the value of syntax element 2103 (e.g., cu_act_enabled_flag) is equal to 0) and LFNST is used (e.g., value of syntax element 2102 (e.g., lfnst_Idx) is greater than 0), the variable 2101 (e.g., ApplyLfnstFlag) can be derived. Therefore, the combination of LFNST and ACT is not allowed for encoding or decoding, hence the complexity of the encoding/decoding process is reduced.

It is appreciated that while the present disclosure refers to various syntax elements providing inferences based on the value being equal to 0 or 1, the values can be configured in any way (e.g., 1 or 0) for providing the appropriate inference.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

The embodiments may further be described using the following clauses:

1. A computer-implemented video encoding method, comprising:
   receiving one or more video sequences for processing; and
   coding the one or more video sequences using only one of a low-frequency non-separable transform (LFNST) and an adaptive color transform (ACT).
2. The method of clause 1, wherein the LFNST and the ACT are in a coded layer video sequence (CLVS) level.
3. The method of clause 2, wherein coding the one or more video sequences using only one of the LFNST and the ACT further comprises:
   enabling the ACT based on a status of the LFNST.
4. The method of clause 3, wherein enabling the ACT based on a status of the LFNST further comprises:
   determining whether to enable the ACT based on the status of the LFNST; and
   enabling the ACT based on the determination that the LFNST is not enabled.
5. The method of clause 4, wherein determining whether to enable the ACT further comprises:
   determining, based on a bitstream conformance constraint, a first flag to be not signaled in response to a second flag being signaled, the first flag enabling the ACT and the second flag enabling the LFNST.
6. The method of clause 2, wherein coding the one or more video sequences using only one of the LFNST and the ACT further comprises:
   enabling the LFNST based on a status of the ACT.
7. The method of clause 6, wherein enabling the LFNST based on a status of the ACT further comprises:
   determining whether to enable the LFNST based on the status of the ACT; and
   enabling the LFNST based on the determination that the ACT is not enabled.
8. The method of clause 7, wherein determining whether to enable the LFNST further comprises:
   determining, based on a bitstream conformance constraint, a first flag to be not signaled in response to a second flag being signaled, the first flag enabling the LFNST and the second flag enabling the ACT.
9. The method of clause 1, wherein the LFNST and the ACT are in coding unit (CU) level.
10. The method of clause 9, wherein coding the one or more video sequences using only one of the LFNST and the ACT further comprises:
    enabling the LFNST based on a status of the ACT not being used in a current coding unit.
11. The method of clause 9, wherein coding the one or more video sequences using only one of the LFNST and the ACT further comprises:
    determining, based on a bitstream conformance constraint, a first flag to be not signaled in response to the LFNST being used in a current coding unit, the first flag enabling the ACT in the current coding unit.
12. The method of clause 9, wherein coding the one or more video sequences using only one of the LFNST and the ACT further comprises:
    determining, based on a bitstream conformance constraint, the LFNST to be not used in a current coding unit in response to a first flag being signaled in the current coding unit, the first flag enabling the ACT in the current coding unit.
13. The method of clause 9, wherein coding the one or more video sequences using only one of the LFNST and the ACT further comprises.
    determining a variable for indicating the LFNST being applied in a current coding unit based on the ACT being not enabled in the current coding unit.
14. An apparatus for performing video data processing, the apparatus comprising:
    a memory figured to store instructions; and
    one or more processors configured to execute the instructions to cause the apparatus to perform:
      receiving one or more video sequences for processing; and
      coding the one or more video sequences using only one of a low-frequency non-separable transform (LFNST) and an adaptive color transform (ACT).
15. The apparatus of clause 14, wherein the LFNST and the ACT are in a coded layer video sequence (CLVS) level.
16. The apparatus of clause 15, wherein the processor is further configured to execute the instructions to cause the apparatus to perform:
    enabling the ACT based on a status of the LFNST.
17. The apparatus of clause 16, wherein the processor is further configured to execute the instructions to cause the apparatus to perform:
    determining whether to enable the ACT based on the status of the LFNST; and
    enabling the ACT based on the determination that the LFNST is not enabled.
18. The apparatus of clause 17, wherein the processor is further configured to execute the instructions to cause the apparatus to perform:
    determining, based on a bitstream conformance constraint, a first flag to be not signaled in response to a second flag being signaled, the first flag enabling the ACT and the second flag enabling the LFNST.
19. The apparatus of clause 15, wherein the processor is further configured to execute the instructions to cause the apparatus to perform:
    enabling the LFNST based on a status of the ACT.
20. The apparatus of clause 19, wherein the processor is further configured to execute the instructions to cause the apparatus to perform:
    determining whether to enable the LFNST based on the status of the ACT; and
    enabling the LFNST based on the determination that the ACT is not enabled.
21. The apparatus of clause 20, wherein the processor is further configured to execute the instructions to cause the apparatus to perform:
    determining, based on a bitstream conformance constraint, a first flag to be not signaled in response to a second flag being signaled, the first flag enabling the LFNST and the second flag enabling the ACT.
22. The apparatus of clause 14, wherein the LFNST and the ACT are in coding unit (CU) level.

23. The apparatus of clause 22, wherein the processor is further configured to execute the instructions to cause the apparatus to perform:
   enabling the LFNST based on a status of the ACT not being used in a current coding unit.
24. The apparatus of clause 22, wherein the processor is further configured to execute the instructions to cause the apparatus to perform:
   determining, based on a bitstream conformance constraint, a first flag to be not signaled in response to the LFNST being used in a current coding unit, the first flag enabling the ACT in the current coding unit.
25. The apparatus of clause 22, wherein the processor is further configured to execute the instructions to cause the apparatus to perform:
   determining, based on a bitstream conformance constraint, the LFNST to be not used in a current coding unit in response to a first flag being signaled in the current coding unit, the first flag enabling the ACT in the current coding unit.
26. The apparatus of clause 22, wherein the processor is further configured to execute the instructions to cause the apparatus to perform:
   determining a variable for indicating the LFNST being applied in a current coding unit based on the ACT being not enabled in the current coding unit.
27. A non-transitory computer readable medium that stores a set of instructions that is executable by one or more processors of an apparatus to cause the apparatus to initiate a method for performing video data processing, the method comprising:
   receiving one or more video sequences for processing; and
   coding the one or more video sequences using only one of a low-frequency non-separable transform (LFNST) and an adaptive color transform (ACT).
28. The non-transitory computer readable medium of clause 27, wherein the LFNST and the ACT are in a coded layer video sequence (CLVS) level.
29. The non-transitory computer readable medium of clause 28, wherein the method further comprises:
   enabling the ACT based on a status of the LFNST.
30. The non-transitory computer readable medium of clause 29, wherein the method further comprises:
   determining whether to enable the ACT based on the status of the LFNST; and
   enabling the ACT based on the determination that the LFNST is not enabled.
31. The non-transitory computer readable medium of clause 30, wherein the method further comprises:
   determining, based on a bitstream conformance constraint, a first flag to be not signaled in response to a second flag being signaled, the first flag enabling the ACT and the second flag enabling the LFNST.
32. The non-transitory computer readable medium of clause 28, wherein the method further comprises:
   enabling the LFNST based on a status of the ACT.
33. The non-transitory computer readable medium of clause 32, wherein the method further comprises:
   determining whether to enable the LFNST based on the status of the ACT; and
   enabling the LFNST based on the determination that the ACT is not enabled.
34. The non-transitory computer readable medium of clause 33, wherein the method further comprises:
   determining, based on a bitstream conformance constraint, a first flag to be not signaled in response to a second flag being signaled, the first flag enabling the LFNST and the second flag enabling the ACT.
35. The non-transitory computer readable medium of clause 27, wherein the LFNST and the ACT are in coding unit (CU) level.
36. The non-transitory computer readable medium of clause 35, wherein the method further comprises:
   enabling the LFNST based on a status of the ACT not being used in a current coding unit.
37. The non-transitory computer readable medium of clause 35, wherein the method further comprises:
   determining, based on a bitstream conformance constraint, a first flag to be not signaled in response to the LFNST being used in a current coding unit, the first flag enabling the ACT in the current coding unit.
38. The non-transitory computer readable medium of clause 35, wherein the method further comprises:
   determining, based on a bitstream conformance constraint, the LFNST to be not used in a current coding unit in response to a first flag being signaled in the current coding unit, the first flag enabling the ACT in the current coding unit.
39. The non-transitory computer readable medium of clause 35, wherein the method further comprises:
   determining a variable for indicating the LFNST being applied in a current coding unit based on the ACT being not enabled in the current coding unit.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:
1. A computer-implemented video encoding method, comprising:
   receiving one or more video sequences for processing;
   signaling a flag for enabling an adaptive color transform (ACT) in coding unit (CU) level;
   enabling a low-frequency non-separable transform (LFNST) based on a status of the ACT not being used in a current coding unit; and
   coding the one or more video sequences using the ACT when the ACT is enabled or using the LFNST when the LFNST is enabled.
2. An apparatus for performing video data processing, the apparatus comprising:
   a memory figured to store instructions; and
   one or more processors configured to execute the instructions to cause the apparatus to perform:

receiving one or more video sequences for processing;
signaling a flag for enabling an adaptive color transform (ACT) in coding unit (CU) level;
enabling a low-frequency non-separable transform (LFNST) based on a status of the ACT not being used in a current coding unit; and
coding the one or more video sequences using the ACT when the ACT is enabled or using the LFNST when the LFNST is enabled.

3. A non-transitory computer readable medium storing a bitstream of a video for processing according to a method comprising:
signaling a flag for enabling an adaptive color transform (ACT) in coding unit (CU) level;
enabling a low-frequency non-separable transform (LFNST) based on a status of the ACT not being used in a current coding unit; and
coding the one or more video sequences using the ACT when the ACT is enabled or using the LFNST when the LFNST is enabled.

4. The method of claim 1, wherein enabling the LFNST based on the status of the ACT not being used in the current coding unit further comprises:
determining a variable for indicating the LFNST being applied in the current coding unit based on the ACT being not enabled in the current coding unit.

5. The method of claim 1, wherein enabling based on the status of the ACT not being used in the current coding unit further comprises:
signaling an index for the LFNST in response to the ACT not being used in the current coding unit.

6. The apparatus of claim 2, wherein in enabling the LFNST based on the status of the ACT not being used in the current coding unit, the one or more processors configured to execute the instructions to cause the apparatus to perform:
determining a variable for indicating the LFNST being applied in the current coding unit based on the ACT being not enabled in the current coding unit.

7. The apparatus of claim 2, wherein in enabling based on the status of the ACT not being used in the current coding unit, the one or more processors configured to execute the instructions to cause the apparatus to perform:
signaling an index for the LFNST in response to the ACT not being used in the current coding unit.

8. The non-transitory computer readable medium of claim 3, wherein enabling the LFNST based on the status of the ACT not being used in the current coding unit further comprises:
determining a variable for indicating the LFNST being applied in the current coding unit based on the ACT being not enabled in the current coding unit.

9. The non-transitory computer readable medium of claim 3, wherein enabling based on the status of the ACT not being used in the current coding unit further comprises:
signaling an index for the LFNST in response to the ACT not being used in the current coding unit.

* * * * *